United States Patent [19]

Band et al.

[11] 3,826,901

[45] July 30, 1974

[54] TIME MULTIPLEXED RATE MULTIPLIER

[75] Inventors: Ian T. Band, Los Altos; Kenneth J. MacLeod, San Jose, both of Calif.

[73] Assignee: Hewlett-Packard Company, Palo Alto, Calif.

[22] Filed: Oct. 12, 1973

[21] Appl. No.: 405,947

[52] U.S. Cl. .......................... 235/150.3, 235/92 DM

[51] Int. Cl. .......................... G06f 15/20

[58] Field of Search .......... 235/150.3, 152, 92 C P, 235/92 D M, 92 T F, 150.5, 151.11; 307/231, 233

[56] References Cited

UNITED STATES PATENTS

| | | | |
|---|---|---|---|
| 3,230,353 | 1/1966 | Greene et al. | 235/150.3 X |
| 3,510,633 | 5/1970 | Kintner | 235/150.3 X |
| 3,735,104 | 5/1973 | Holmgren | 235/150.3 X |
| 3,764,784 | 10/1973 | Haner et al. | 235/150.3 |

*Primary Examiner*—Joseph F. Ruggiero
*Attorney, Agent, or Firm*—A. C. Smith

[57] ABSTRACT

Outputs from a plurality of pulse counters are time multiplexed in a sequence determined by detection of individual pulse counters being in a selected counting state. The time multiplexed counter outputs control a pulse selector which acts as a gate to rate multiply an applied input signal in response to the time multiplexed counter outputs and control word outputs from a control word source.

17 Claims, 6 Drawing Figures

TIME MULTIPLEXED RATE MULTIPLIER

BACKGROUND OF THE INVENTION

Digital Rate Multipliers are devices which accept as input a series of pulses and produce as output another series of pulses. The output pulse series contains a fraction between 0 and 1 of the number of pulses in the input series. The desired fraction is typically selected by applying a control word to a group of control lines. Typical rate multipliers which accept a control word of n digits of radix *r* require n pulse counters of radix *r* and *n* sets of pulse-selection circuitry in order to select the appropriate input pulses to be passed to the output.

SUMMARY OF THE INVENTION

This invention reduces the amount of pulse-selection circuitry required to serve all the counter digits of an *n*-digit rate multiplier and reduces power comsumption and size. This is accomplished in the preferred embodiment by time multiplexing the output of all the pulse counters to one pulse-selector in a sequence determined by detection of individual pulse counters being in a selected counting state. Depending on the control word, a fastest-counting pulse counter of radix *r* can produce from 0 to *r*-1 output pulses as it cycles through its *r* states. Thus, there is one state called S, during which it can never produce a pulse. When the fastest-counting pulse counter, which corresponds to a least significant digit, is determined to be in state S, then the outputs of the next-fastest-counting pulse counter are connected to the inputs of the pulse-selection circuitry. When both the fastest and second fastest pulse counters are in state S, the outputs of the third pulse counter are connected to the inputs of the pulse-selection circuitry, and so on for each succeeding pulse counter. A control word corresponding to a particular counter is simultaneously switched to the pulse-selection circuitry.

DESCRIPTION OF THE PREFERRED EMBODIMENTS

Figure 1:
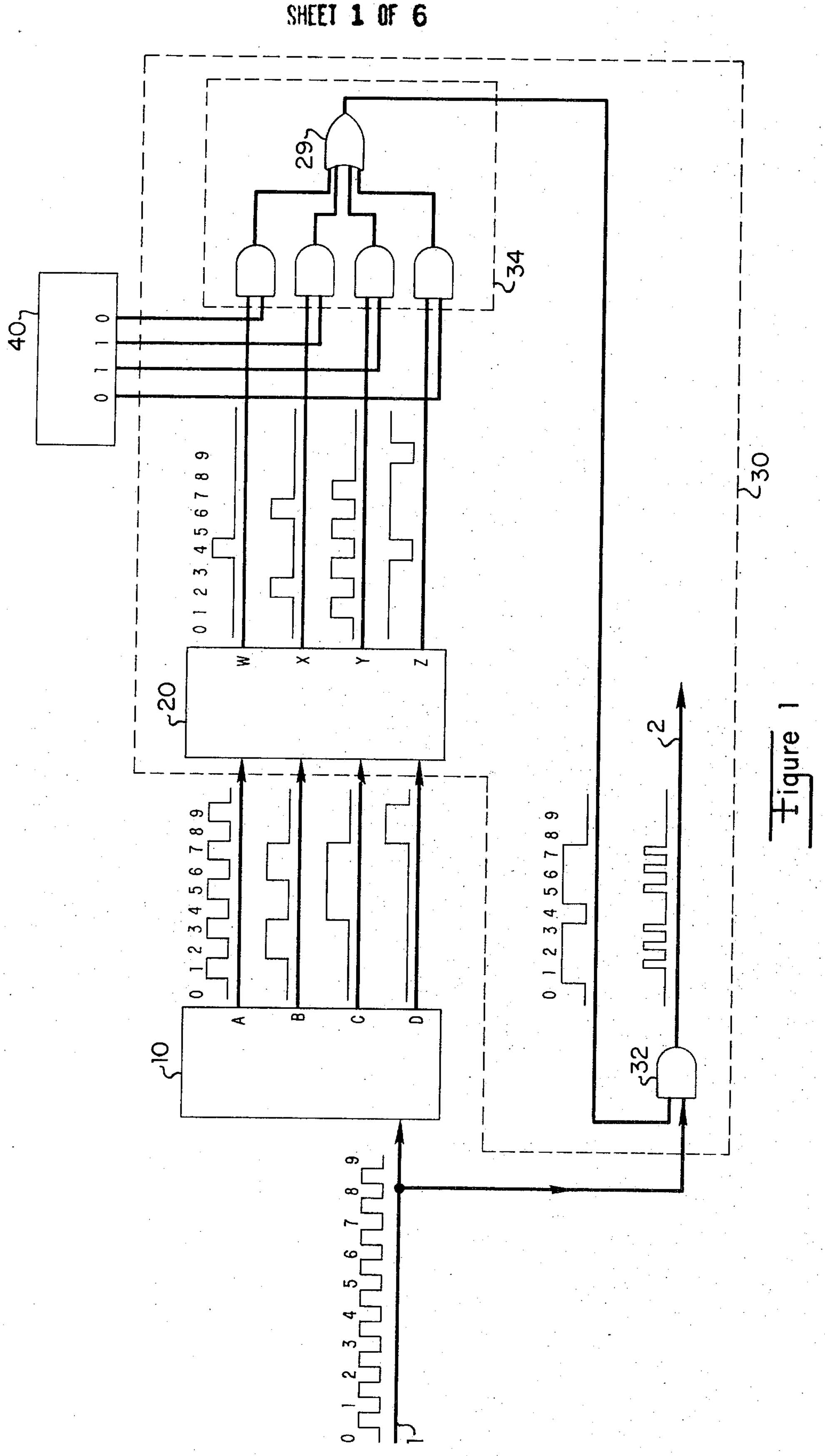
FIG. 1 is a block diagram of a one-digit rate multiplier.

Referring to FIG. 1, the circuit shown produces for each group of ten pulses of the input pulse train 1, from zero to nine output pulses 2 under control of the BCD programming input 40. Outputs A, B, C, and D of the BCD decade counter 10 are used by the converting logic 20 to generate waveforms W, X, Y, and Z, which are in the logic 1 state during, one, two, four, and eight clock times out of ten, respectively. The location of the logic one states of W, X, and Y are chosen not to overlap, as are the logic 1 states of W and Z as shown in FIG. 1. These waveforms and the programming input 40 are then selectively combined in the pulse adder 29, to produce a waveform that is in the logic 1 state from zero to nine clock times out of ten. This output controls the gating of input pulses. In FIG. 1, a BCD 6 (0110) at the programming input 40 causes six input pulses out of ten to be passed through the pulse gate 32 to the output 2.

Figure 2:
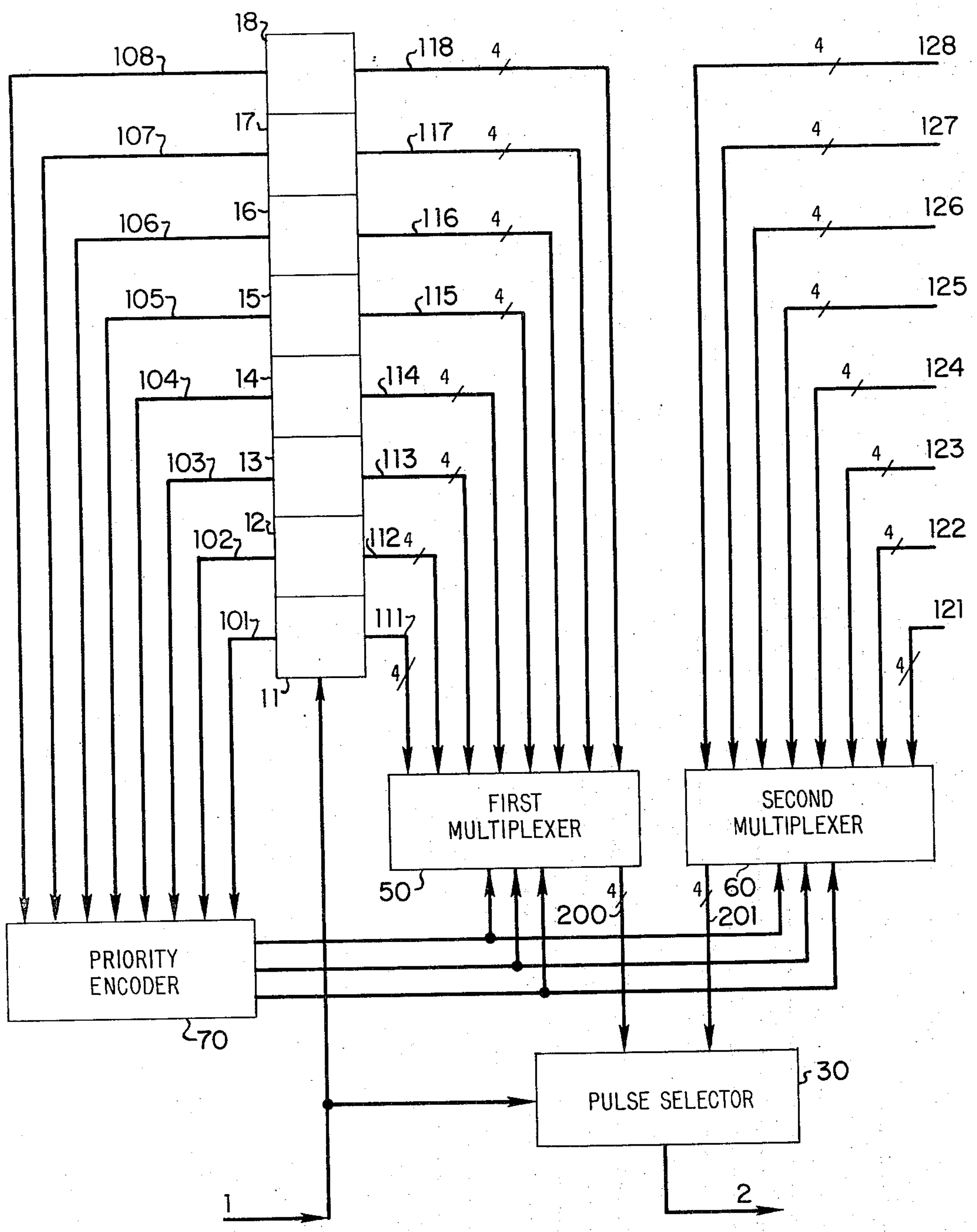
FIG. 2 is a block diagram of an eight-digit rate multiplier made in accordance with one embodiment of this invention.

The first preferred embodiment, referring to FIG. 2, forms the output for each decade as in the one-digit case of FIG. 1. The embodiment shown has $n = 8$ and $r = 10$, or in other words an 8 digit decimal time-multiplexed rate multiplier is described. This unit uses conventional electronic decade counters in integrated circuit form, for example, Fairchild 9310 or 93L10 or National Semiconductor 86L75 or Texas Instruments 54160, 54162, 74160, 74162, or the like.

The inactive state S for each decade is selected to be 9. This choice takes advantage of the fact that these conventional types of integrated circuits (IC's) generate an output called Terminal Count or TC which is a logic 1 output level only when the decade is in the count state 9. The decision of which decade to multiplex to the pulse selector is made by examining the TC outputs, 101 through 108 in FIG. 2. The priority encoder 70 may be a conventional encoder circuit in integrated circuit form, for example, a Fairchild type 9318 or 93L18, or the like. These encoder circuits are 8-input priority encoders that select the fastest-counting decade which is not in state 9 and generate a digit select code which identifies that decade.

All eight outputs 111 through 118 are multiplexed by the first multiplexer 50 in response to the coding signal output from the priority encoder 70 into the pulse selector 30 on the counter line 200. Corresponding control words 121 through 128 which are produced from a series of latches are multiplexed by a second multiplexer 60 in response to the coding signal output from the priority encoder 70 on the control word line 201 to the pulse selector 30. Since the first decade 11, in the string, corresponding to the least significant digit, counts ten times as fast as the second decade 12, it produces ten times as many output pulses. All the output pulses of the second decade 12 are multiplexed onto the counter line 200 when the first decade 11 is in the 9 or S state. Similarly, the output pulses from the third decade 13 can be put on the counter line 200 when the first two decades 11 and 12 are in the 99 state; and so on, for each succeeding decade 13 through 18. To reduce package count and power consumption, the first embodiment has only one digit of converting 32 and combining 34 logic and multiplexes the eight decade counters 11 through 18 to the pulse selector 20 in the order outlined above and as shown in FIG. 2.

Figure 3:
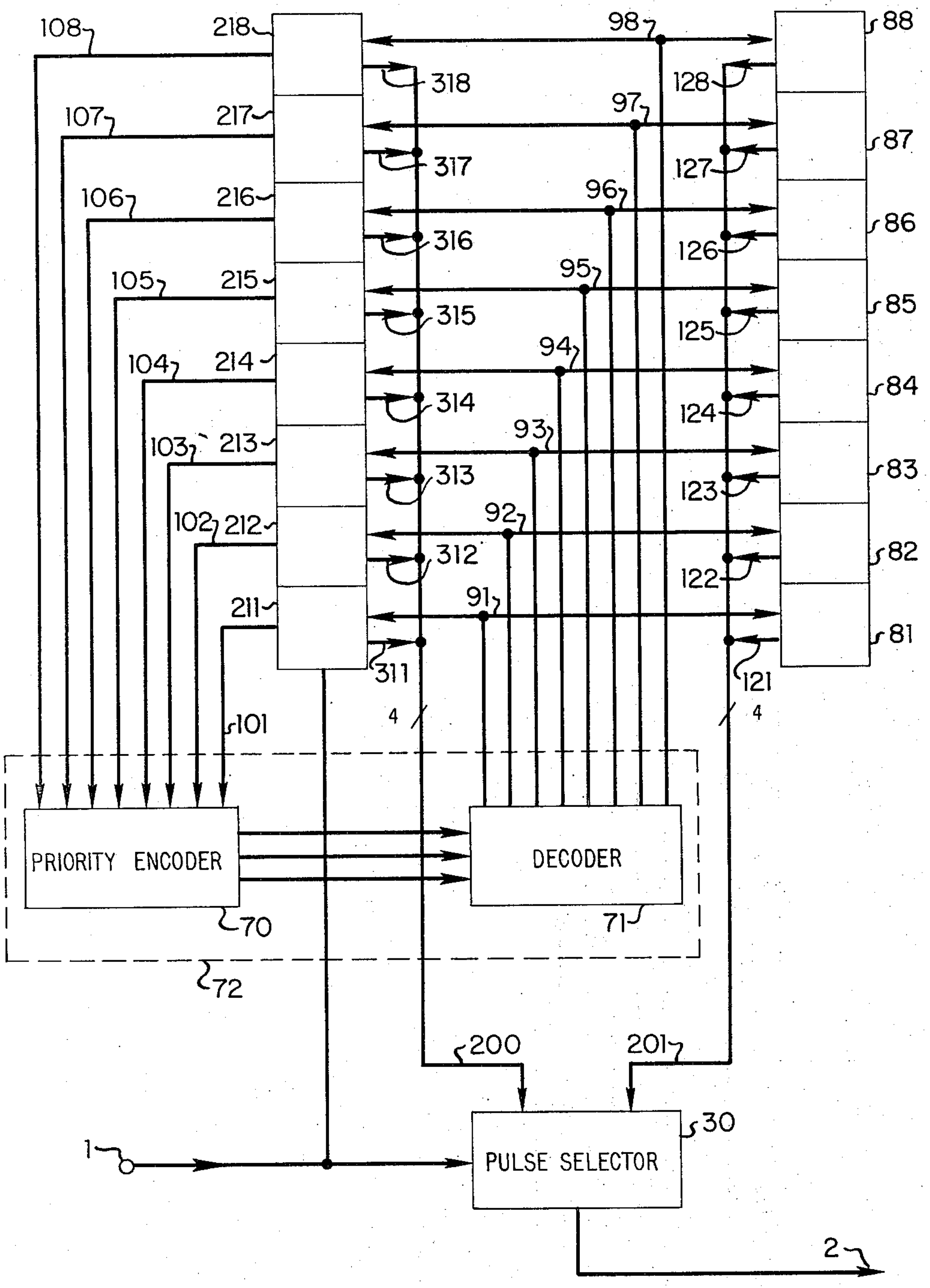
FIG. 3 is a block diagram of another embodiment of the invention which utilizes electronic counters and control word sources with three-state outputs.

A further saving of packages is achieved as shown in FIG. 3 by utilizing conventional electronic counters 211 through 218 with three-state outputs 311 through 318 in integrated circuit form, for example, National Semiconductor 7555 or 8555, or the like. The priority enable means 72, which consists of the priority encoder 70 and the 3-8 decoder 71, (for example, Fairchild 9301, 93L01, Texas Instruments 74LS138, 7442A or the like) determines the fastest counting decade which is not in the 9 or S state and sends an enable signal on one of the enable lines 91 through 98 to both a decade counter and a three state latch which corresponds to a particular control word latch 81 through 88 associated with that decade counter. Since the counters 211 through 218 and the control word latches 81 through 88 in FIG. 3, are three state they produce an output to which the pulse selector 30 will respond only when an enable signal is sent to them. The time multiplexing is accomplished by sequentially enabling a decade counter and a digit of the control word in accordance with the states of all the TC outputs as counters count through their radix. In this embodiment, the multiplexing function is provided by the combination and interconnection of three state counters 211 through 218, three state latches 81 through 88 and the sequential enabling in response to processing of the TC outputs 101 through 108 by the priority enable means 72 as shown in FIG. 3. The three state latches 81 through 88 function as a control word memory.

Figure 4:
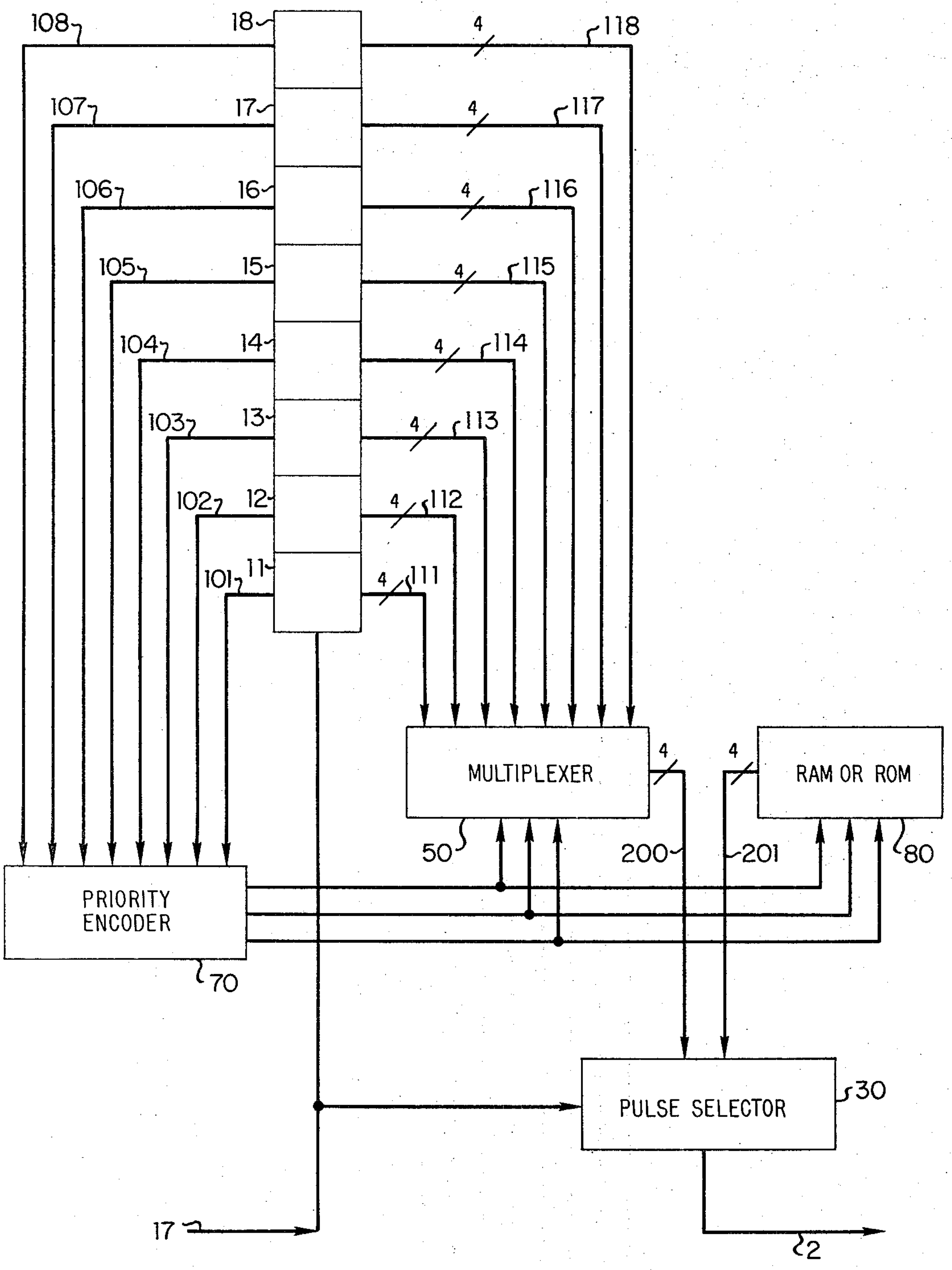
FIG. 4 is a block diagram of an embodiment of the invention which stores control words in a memory and requires a multiplexer.

In the illustrated embodiment of FIG. 4, control words are stored in a memory 80, such as a read only or random access memory. Time multiplexing is accomplished by the first multiplexer 50 producing a particular counter output and the memory 80 producing a corresponding digit of the control word in response to an output from the priority encoder 70. The encoder output serves as an address for the memory.

Figure 5:
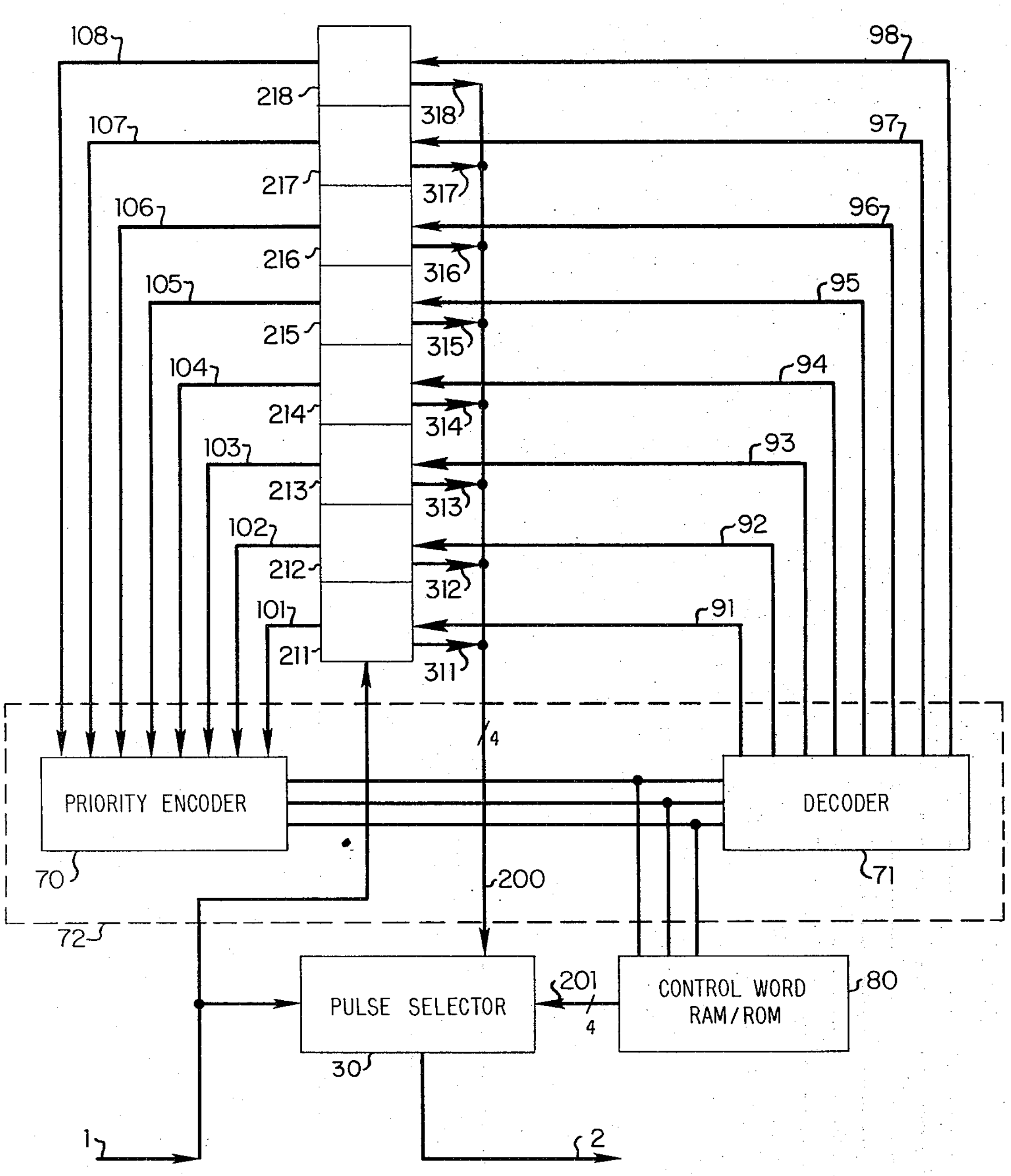
FIG. 5 is a block diagram of another embodiment of the invention which stores control words in a memory and does not require a multiplexer.

In the embodiment shown in FIG. 5, time multiplexing is accomplished without requiring separate multiplexers. Conventional electronic counters 211-218 with three state outputs, for example, National Semiconductor 7555 or 8555, or the like, are used. The priority enable means 72, consisting of the priority encoder 70 and the 3-8 decoder 71, determines the fastest counting decade which is not in an S state and produces a coding signal which enables one of the three state pulse counters 211 through 218 and addresses a particular digit of the control word which is stored in the memory 80.

Figure 6:
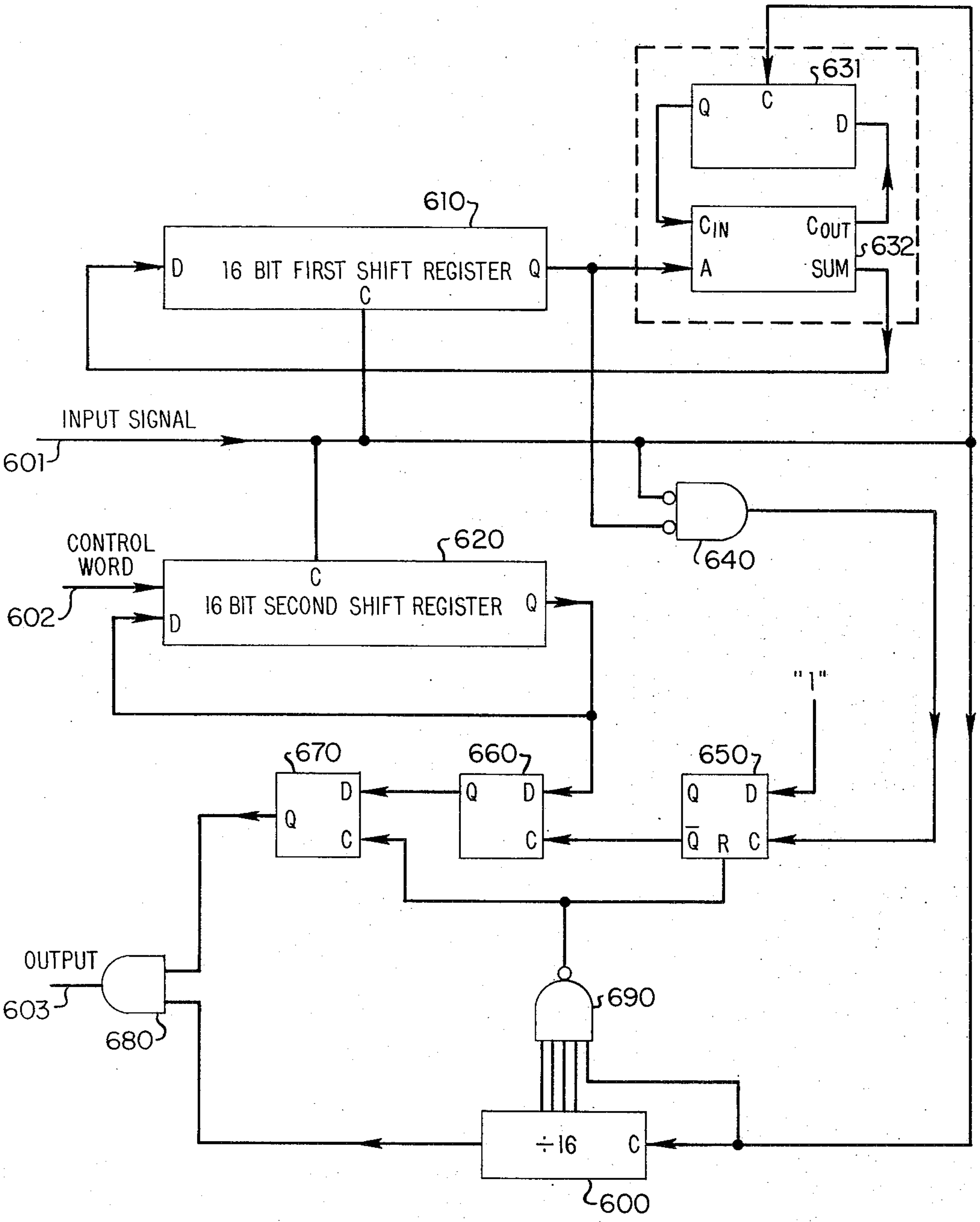
FIG. 6 is a block diagram of an embodiment of the invention which utilizes shift registers for counting and multiplexing.

In the embodiment shown in FIG. 6 a carry latch 631 is first set to a logic 1 state and is added to the contents of a first shift register 610 to make it a counter. To count one count, all bits stored in the first shift register 610 are shifted out a bit at a time and in synchronism with the input signal 601 through a serial adder 632, and back into the first shift register 610. In the binary counter shown, the state S is chosen to be logic state 1. The first (fastest counting) bit that is not in state S is selected by selecting the first bit in the 0 state.

The output from the first shift register 610 and the input signal 601 are applied to an AND gate 640. The output of the AND gate 640 is fed into a latch 650 which is initially set to 0 logic state at the end of each cycle by a gate 690. The first bit from the shift register 610 in the 0 state will clock the latch 650 into the 1 state. This change in state of the output of the latch 650 clocks the current bit of a control word stored in the second shift register 620 into a latch 660. At the end of the cycle, the latch 650 is again reset, and the state of the latch 660 is clocked into a latch 670. During the next cycle, if the state of latch 670 is 1, a pulse is produced at the output. If the state of latch 670 is 0, no pulse is produced. The control word 602 stored in the second shift register 620 is shifted in synchronism with the input signal 601. The second latch 660 stores a state of a corresponding control bit from the second shift register 620 until all 16 bits have been shifted. The latches 650, 660, and 670 select and store the bit of the control word corresponding to the fastest-counting bit of the counter which is not in state S and thereby perform the necessary time multiplexing in this embodiment. The second shift register 620 serves as the control word memory.

The third latch 670 controls whether or not a pulse from a 4 bit counter 600 will be passed through a gate 680. This pulse is passed to the output if the control word bit is a 1, and is not passed if the control word bit is a 0. At the end of the 16th bit time, the latch 650 resets and a third latch 670 is clocked. The latch 650 and the second latch 660 then begin a new counting cycle. The gate 680 is where the pulse selection takes place.

I claim:

1. A time multiplexed rate multiplier comprising:

a plurality of pulse counters, a first one of the pulse counters receiving an input signal and each of said pulse counters producing outputs corresponding to a number of pulses counted and corresponding to the pulse counter being in a selected counting state;

means coupled to each of the pulse counters and responsive to a pulse counter in a less significant counting position producing an output in response to a selected number of pulses counted for activating a pulse counter in a next more significant counting position to accummulate a count;

a priority encoder connected to receive the outputs of each of the pulse counters for detecting the pulse counter in the least significant counting position which is not in said selected counting state and for producing a coding signal identifying said pulse counter;

a first multiplexer connected to the priority encoder for receiving said coding signal and to the plurality of pulse counters for receiving the outputs of the pulse counters for producing an output only in response to the appearance of said coding signal and an output produced by the pulse counter identified by said coding signal;

a source of control words having outputs and producing control words at the outputs;

a second multiplexer connected to the priority encoder and outputs of the source of control words for producing an output only in response to an appearance of said coding signal, said output being representative of a control word digit corresponding to said coding signal; and a pulse selector having a plurality of inputs connected to receive the outputs of the first multiplexer and second multiplexer and the input signal for producing an output in response to the appearance at its inputs of the input signal and the outputs of the first multiplexer and second multiplexer.

2. A time multiplexed rate multiplier as in claim 1 wherein the source of control words includes a random access memory.

3. A time multiplexed rate multiplier as in claim 1 wherein the source of control words includes a read only memory.

4. A time multiplexed rate multiplier as in claim 1 wherein the means coupled to each of the pulse counters activates a pulse counter in a next more significant counting position to accumulate a count in response to a pulse counter in a less significant counting position producing an output in response to a fixed radix number of pulses counted whereby each counter will count pulses according to said fixed radix number.

5. A time multiplexed rate multiplier as in claim 4 wherein the fixed radix number is ten.

6. A time multiplexed rate multiplier comprising a plurality of pulse counters, a first one of the pulse counters having an input for receiving an input signal and each of said pulse counters having an enable input, each of said pulse counters being capable of assuming three output states as a first output, two of the output states in combination corresponding to a number of pulses counted and the third output state corresponding to the condition in which an enable signal is not present at the enable input, the second output corresponding to the pulse counter being in a selected counting state;

means coupled to each of the pulse counters and responsive to a pulse counter in less significant counting position producing an output in response to a selected number of pulses counted for activating a pulse counter in a next more significant counting position to accumulate a count;

priority enable means having inputs connected to the outputs of each of the plurality of pulse counters and outputs connected to the enable input of each of the plurality of pulse counters for detecting the pulse counter corresponding to the least significant digit which is not in said counting state and for applying an enable signal to said pulse counter in response to said detection;

a control word source having inputs connected to receive the output of the priority enable means for producing a plurality of control words each in response to the output from the priority enable means; and a pulse selector connected to receive the outputs of the pulse counters, a control word from the control word source and the input signal for producing an output in response to the appearance of the outputs of the pulse counters, the control word and the input signal.

7. A time multiplexed rate multiplier as in claim 6 wherein the control word source includes a read only memory.

8. A time multiplexed rate multiplier as in claim 6 wherein the control word source includes a random access memory.

9. A time multiplexed rate multiplier as in claim 6 wherein the control word source comprises a plurality of three state latches.

10. A time multiplexed rate multiplier as in claim 6 wherein the means coupled to each of the pulse counters activates a pulse counter in a next more significant counting position to accumulate a count in response to a pulse counter in a less significant counting position producing an output in response to a fixed radix number of pulses counted whereby each counter will count pulses according to said fixed radix number.

11. A time multiplexed rate multiplier as in claim 10 wherein the fixed radix number is ten.

12. A time multiplexed rate multiplier comprising:

a plurality of pulse counters, a first one of the pulse counters receiving an input signal and each of said pulse counters producing outputs corresponding to a number of pulses counted and corresponding to the pulse counter being in a selected counting state;

means coupled to each of the pulse counters and in response to a pulse counter in a less significant counting position producing an output in response to a selected number of pulses counted for activating a pulse counter in a next more significant counting position to accumulate a count;

a priority encoder having inputs connected to receive the outputs of each of the pulse counters for detecting the pulse counter in the least significant counting position which is not in said selected counting state and for producing a coding signal identifying said pulse counter;

a first multiplexer connected to receive said coding signal and the outputs of the pulse counters for producing an output only in response to the appearance of said coding signal and an output produced by the pulse counter identified by said coding signal;

a control word source having inputs and outputs and its inputs connected to the output of the priority encoder means for producing as an output control words in response to the coding signal; and a pulse selector having a plurality of inputs connected to receive the outputs of the first multiplexer, memory, and an input signal for producing an output in response to the appearance of an input signal and the outputs of the first multiplexer and control word source.

13. A time multiplexed rate multiplier as in claim 12 wherein the control word source includes a read only memory.

14. A time multiplexed rate multiplier as in claim 12 wherein the control word source includes a random access memory.

15. A time multiplexed rate multiplier as in claim 12 wherein the means coupled to each of the pulse counters activates a pulse counter in a next more significant counting position to accumulate a count in response to a pulse counter in a less significant counting position producing an output in response to a fixed radix number of pulses counted whereby each counter will count pulses according to said fixed radix number.

16. A time multiplexed rate multiplier as in claim 15 wherein the fixed radix number is two.

17. A time multiplexed rate multiplier as in claim 16 wherein the control word source includes a shift register shifted in synchronism with the input signal.

* * * * *